United States Patent
Tang

(10) Patent No.: US 10,897,731 B2
(45) Date of Patent: Jan. 19, 2021

(54) CARRIER SELECTION METHOD, TERMINAL DEVICE AND COMPUTER STORAGE MEDIUM

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/465,025

(22) PCT Filed: Sep. 15, 2017

(86) PCT No.: PCT/CN2017/101842
§ 371 (c)(1),
(2) Date: May 29, 2019

(87) PCT Pub. No.: WO2019/051757
PCT Pub. Date: Mar. 21, 2019

(65) Prior Publication Data
US 2019/0297548 A1      Sep. 26, 2019

(51) Int. Cl.
*H04W 36/08*     (2009.01)
*H04W 76/38*     (2018.01)
*H04W 48/20*     (2009.01)
*H04W 72/04*     (2009.01)

(52) U.S. Cl.
CPC ........... *H04W 36/08* (2013.01); *H04W 48/20* (2013.01); *H04W 72/0453* (2013.01); *H04W 76/38* (2018.02)

(58) Field of Classification Search
CPC ... H04W 4/40; H04W 72/02; H04W 72/0453; H04L 5/001
See application file for complete search history.

(56) References Cited

U.S. PATENT DOCUMENTS

| | | | |
|---|---|---|---|
| 2002/0052201 A1* | 5/2002 | Wilhelmsson | H04W 36/06 455/434 |
| 2011/0268029 A1 | 11/2011 | Tseng | |
| 2015/0327144 A1* | 11/2015 | Dalsgaard | H04W 36/30 370/252 |

FOREIGN PATENT DOCUMENTS

| CN | 101516095 A | 8/2009 |
|---|---|---|
| CN | 101784076 A | 7/2010 |
| CN | 103716142 A | 4/2014 |
| CN | 105323811 A | 2/2016 |
| CN | 105376812 A | 3/2016 |

(Continued)

OTHER PUBLICATIONS

3GPP TSG RAN WG1 Meeting #89; R1-1708426; Hangzhou, P.R. China May 15-19, 2017.

(Continued)

*Primary Examiner* — Gregory B Sefcheck
*Assistant Examiner* — Debebe A Asefa

(57) ABSTRACT

A carrier selection method, a terminal device and a computer storage medium are disclosed. The method includes: running at least one process on at least one carrier, wherein different processes are run on a same carrier or different carriers; and performing carrier re-selection for at least part of the at least one process when a carrier re-selection timer expires is detected.

20 Claims, 3 Drawing Sheets

101
Run at least one process on at least one carrier

102
Perform carrier re-selection on at least part of the at least one process when a carrier re-selection timer expires is detected

(56) References Cited

FOREIGN PATENT DOCUMENTS

| CN | 106714309 A | 5/2017 |
|----|-------------|--------|
| CN | 106900033 A | 6/2017 |
| EP | 2802168 A1 | 11/2014 |
| WO | 2010088329 A1 | 8/2010 |

OTHER PUBLICATIONS

3GPP TSG RAN WG2 Meeting #95-bis; R2-166303; Kaohsiung, Oct. 10-14, 2016.
Chinese Office Action dated Dec. 6, 2019 for Application No. 201780050437.8 with Translation.
Intel Corporation Discussion on Resource Reselection Triggers for V2V Communication 3GPP TSG RAN WGI Meeting #85, RI-164138 27.5 }3 2016(27.05_2016).
Intel Corporation Sidelink Carrier Aggregation for Mode-4 LTE V2V Communication 3GPP TSG RAN WGI Meeting #90 , RI-1712481 25.8 }3 2017(Aug. 25, 2017).
Extended European search report issued in corresponding European application No. 17924939.6 dated Aug. 7, 2019.

\* cited by examiner

CARRIER SELECTION METHOD, TERMINAL DEVICE AND COMPUTER STORAGE MEDIUM

CROSS-REFERENCE TO RELATED APPLICATION(S)

This application is a 371 application of International Application No. PCT/CN2017/101842, filed on Sep. 15, 2017, the entire disclosure of which is hereby incorporated by reference.

TECHNICAL FIELD

The present disclosure relates to the technical field of vehicle to everything, in particular to a carrier selection method, a terminal device and a computer storage medium.

BACKGROUND

A vehicle to everything (V2X) system is a system in which a side link (SL) transmission technology based on LTE-D2D is adopted. Different from the traditional Long Term Evaluation (LTE) system in which communication data is received or sent through a base station, the V2X system adopts a terminal-to-terminal direct communication mode, and thus the V2X system has a higher spectral efficiency and a lower transmission delay.

In Release 14 (Rel-14) of the 3rd generation partnership project (3GPP), the V2X technology is standardized, and two transmission modes are defined: mode 3 and mode 4. Herein, in mode 4, a vehicle terminal adopts a transmission mode of sensing and reservation. The vehicle terminal acquires a set of available transmission resources in a resource pool by sensing, and the terminal randomly selects a resource from the set for data transmission. Since services in the V2X have a periodic characteristic, the terminal usually adopts a semi-static transmission mode, that is, after selecting a transmission resource, the terminal will continuously use the resource in multiple transmission periods, thus reducing probabilities of resource re-selection and resource conflict. The terminal will carry information of a resource reserved for next transmission in the control information of a current transmission, so that other terminals can determine whether a resource is reserved and used by the terminal by detecting the control information of the terminal, thus achieving a purpose of reducing resource conflicts.

However, the above-mentioned mode of selecting the resource for the terminal cannot adapt to more application scenarios, especially cannot well adapt to a scenario in which multiple carriers are selected in a terminal.

SUMMARY

To solve the above technical problems, implementations of the present disclosure provide a carrier selection method, a terminal device and a computer storage medium.

A carrier selection method provided by an implementation of the present disclosure is applied to a terminal device, and includes: running at least one process on at least one carrier; wherein different processes are run on a same carrier or different carriers; and performing carrier re-selection on at least part of the at least one process when a carrier re-selection timer expires is detected.

A terminal device provided by an implementation of the present disclosure includes a communication unit and a processing unit. The communication unit is used for running at least one process on at least one carrier; wherein different processes are run on a same carrier or different carriers. The processing unit is used for performing carrier re-selection on at least part of the at least one process when a carrier re-selection timer expires is detected.

A terminal device provided by an implementation of the present disclosure includes a processor and a storage for storing a computer program that is executable on the processor. The processor is used for executing the computer program to perform the acts of the above method.

A computer storage medium provided by an implementation of the present disclosure stores computer executable instructions, and when the computer executable instructions are executed, the carrier selection method of the implementation of the present disclosure is implemented.

DETAILED DESCRIPTION

To understand features and technical contents of implementations of the present disclosure in more detail, the implementations of the present disclosure will be described in detail below with reference to the drawings, which are used for reference only and are not intended to limit the implementations of the present disclosure.

Example One

Figure 1:
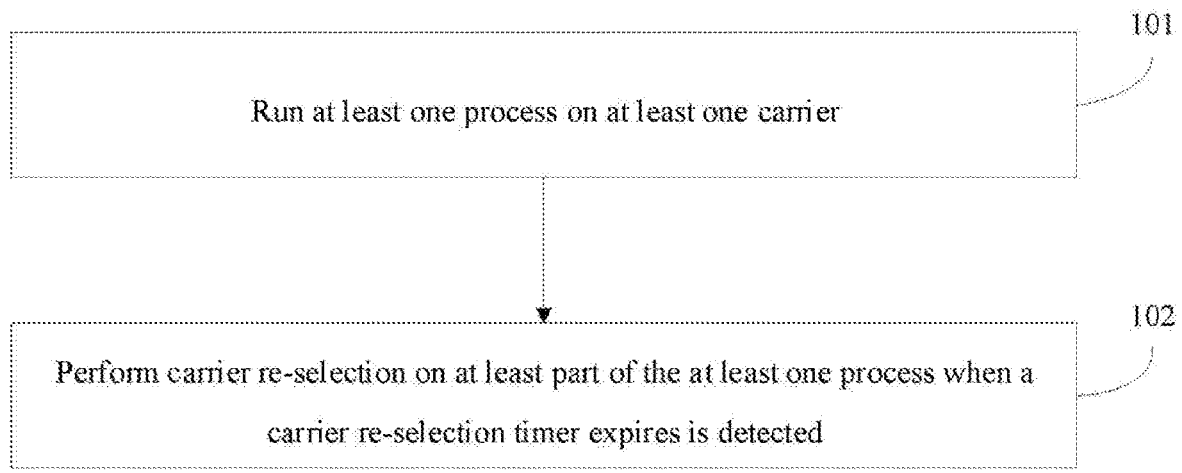
FIG. 1 is a flow chart of a carrier selection method according to an implementation of the present disclosure.

The implementation of present disclosure provides a carrier selection method applied to a terminal device, as shown in FIG. 1. The carrier selection method includes acts 101 and 102.

In 101, at least one process is run on at least one carrier; wherein different processes are run on a same carrier or different carriers.

In 102, when it is detected that a carrier re-selection timer expires, carrier re-selection is performed on at least part of the at least one process.

Herein, the terminal device may be a vehicle terminal.

The terminal device may run one process, and preferably, may run two or more processes. It can be understood that one terminal device may support one or more service types, and one or more processes may be run under different services.

In addition, a numerical value of the carrier re-selection timer may be configured according to an actual situation, for example, the terminal device may pre-configure the carrier re-selection timer, or the terminal device may receive configuration for the carrier re-selection timer from a network side. That is, the terminal device may receive a configuration parameter for the carrier re-selection timer from the network side to configure the carrier re-selection timer based on the configuration parameter.

No matter the terminal device performs the pre-configuration or the network side performs the configuration, the configuration for the carrier re-selection timer may be modified according to a situation of the terminal device itself or other parameters. As for the time of modification, the carrier re-selection timer may be configured periodically; or may be configured when the situation of the terminal device itself changes; or may be modified directly by the network side, occurrence time of which is determined by the network side.

In the implementation, if the carrier re-selection timer expires, the user (i.e. the terminal device) performs the carrier re-selection, and the carrier re-selection may be performed on all processes of the user, or may be performed on a part of the processes of the user.

It can be understood that whether the carrier re-selection is performed on all processes or a part of processes of the terminal device or the user may be determined based on various situations in combination, for example: whether all current carriers are re-configured by the network side, if yes, the carrier re-selection may be performed on all processes; if a part of current carriers are re-configured by the network side, the carrier re-selection is performed on processes on the part of carriers which are re-configured; whether a sum of a data amount borne on at least one current carrier may carry a service data amount, if yes, a part of processes may be selected for the carrier re-selection.

It should be noted that whether all processes or a part of processes are selected for the carrier re-selection may include not only the above several manners, but also other manners, which is not exhaustive here.

On the basis of the above, there may be following scenarios corresponding to two levels of carrier re-selection timers.

Scenario One

The carrier re-selection timer is a carrier re-selection timer for the terminal device.

Correspondingly, the method further includes: a numerical value of the carrier re-selection timer is determined based on a movement speed of the terminal device.

The scenario is aimed at a case in which one terminal device (or a user level) corresponds to one carrier re-selection timer, then the terminal device may refer to the same carrier re-selection timer to determine whether it expires regardless of which service the terminal device runs, and then controls all or part of the processes to perform the carrier re-selection.

Scenario Two

The carrier re-selection timer is a carrier re-selection timer corresponding to a service running on the terminal device; and carrier re-selection timers corresponding to different services are different.

Correspondingly, the method further includes determining numerical values of carrier re-selection timers corresponding to different services based on different service types.

Specifically, a numerical value of a carrier re-selection timer corresponding to a service type may be pre-configured according to an actual situation. For example, it may be configured according to a characteristic parameter of the service, and of course, it may be configured according to an average data transmission amount of the service, etc., which is not exhaustive here.

Furthermore, the carrier re-selection timer corresponding to the service type may be configured based on the service type in combination with a movement speed of the terminal device.

For example, in a case of a service type A, if the movement speed of the terminal device reaches a first level, then a numerical value of the carrier re-selection timer is configured to a; and if the movement speed of the terminal device reaches a second level, the numerical value of the carrier re-selection timer is configured to b.

If it is detected that the carrier re-selection timer expires, the carrier re-selection is performed on at least part of the at least one process, which includes: detecting whether a carrier re-selection timer corresponding to a service among at least one carrier re-selection timer corresponding to at least one service expires; and when a carrier re-selection timer corresponding to a service expires, performing the carrier re-selection on at least part of processes on at least part of carriers corresponding to the service.

That is, in the scenario, the carrier re-selection is performed on all or part of multiple processes corresponding to the service.

Whether the carrier re-selection is specifically performed on all or part of the processes of the service, may be adjusted according to a situation of the carrier, which is not repeated here.

Finally, it should be noted that: if it is detected that the carrier re-selection timer does not expire, a process on which resource re-selection is needed to be performed is determined from the at least one process as a first process; and a carrier of the first process is kept unchanged and the resource re-selection is performed on the first process on the carrier.

In other words, when the timer operates, the carrier re-selection cannot be performed, i.e., for each process, resource re-selection can only be performed on the current carrier.

In addition, when the carrier re-selection is completed, the timer is restarted.

Figure 2:
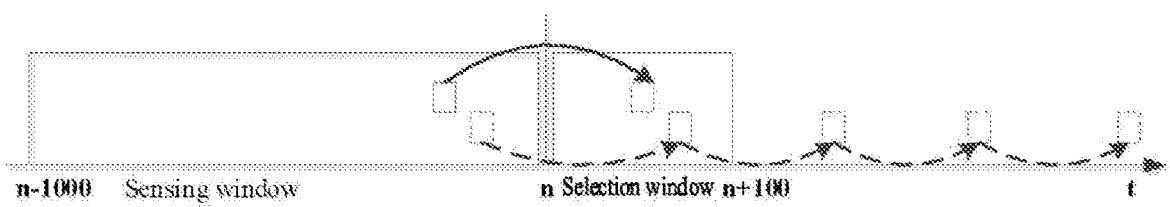
FIG. 2 is a schematic diagram of a resource allocation scenario.

The sensing and reservation mode in the prior art may be as shown in FIG. 2. When a new data packet arrives at a time point n, and a resource selection is required, the terminal will select a resource within [n+T1, n+T2] milliseconds according to a sensing result during the past 1 second, where T1=4; 20<=T2<=100.

A process for the terminal to select the resource in the selection window is as follows: the terminal selects all available resources in the selection window as a set A, and the terminal performs an exclusion operation on the resources in the set A: if the terminal does not have a sensing result for some subframes in a sensing window, resources of these subframes on the corresponding subframes in the selection window are excluded. If the terminal detects a physical sidelink control channel (PSCCH) in the sensing window, a PSSCH-reference signal receiving power (RSRP) corresponding to the PSCCH is higher than a threshold, and a reserved next transmission resource in the control information has a resource conflict with data to be sent by the user, the user excludes the resource from the set A.

The terminal performs a sidelink-received signal strength indication (S-RSSI) detection on the remaining resources in the set A, and sorts the remaining resources according to energy from high to low, puts 20% of the resources (relative to the number of resources in the set A) with the lowest energy into a set B. The terminal selects a resource in an equal probability from the set B for data transmission.

However, the above solution of the prior art does not consider a multi-carrier scenario expanded in Rel-15. By adopting the above solution of the present disclosure, it can be determined whether to control at least part of the processes of the terminal device to perform the carrier re-selection based on the carrier re-selection timer. Thus, the carrier re-selection processing can be independently performed on any one or more of all processes running on the terminal device, thereby providing more processing scenarios for the terminal device to perform the carrier selection.

Example Two

Figure 3:
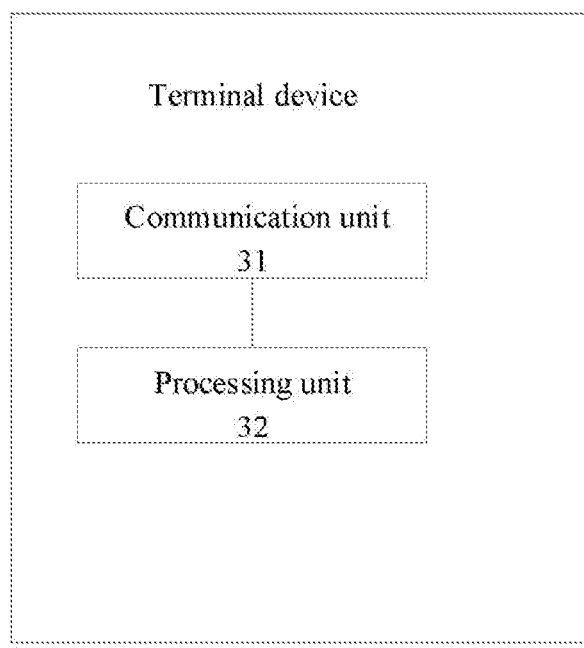
FIG. 3 is a schematic diagram of structure of a terminal device according to an implementation of the present disclosure.

An implementation of the present disclosure provides a terminal device, as shown in FIG. 3. The terminal device includes a communication unit 31 and a processing unit 32.

The communication unit 31 is used for running at least one process on at least one carrier; wherein different processes are run on a same carrier or different carriers.

The processing unit 32 is used for performing carrier re-selection for at least part of the at least one process when a carrier re-selection timer expires is detected.

Herein, the terminal device may be a vehicle terminal.

The terminal device may run one process, and preferably, may run two or more processes. It can be understood that one terminal device may support one or more service types, and one or more processes may be run under different services.

In addition, a numerical value of the carrier re-selection timer may be configured according to an actual situation, for example, the terminal device may pre-configure the carrier re-selection timer, or the terminal device may receive configuration for the carrier re-selection timer from a network side. That is, the terminal device may receive a configuration parameter for the carrier re-selection timer from the network side to configure the carrier re-selection timer based on the configuration parameter.

No matter the terminal device performs the pre-configuration or the network side performs the configuration, the configuration for the carrier re-selection timer may be modified according to a situation of the terminal device itself or other parameters. As for the time of modification, the carrier re-selection timer may be configured periodically; or may be configured when the situation of the terminal device itself changes; or may be modified directly by the network side, occurrence time of which is determined by the network side.

In the implementation, if the carrier re-selection timer expires, the user (i.e. the terminal device) performs the carrier re-selection. The carrier re-selection may be performed on all processes of the user, or may be performed on a part of the processes of the user.

It can be understood that whether the carrier re-selection is performed on all processes or a part of processes of the terminal device or the user may be determined based on various situations in combination, for example: whether all current carriers are re-configured by the network side, if yes, the carrier re-selection is performed on all processes; if a part of current carriers are re-configured by the network side, the carrier re-selection is performed on processes on the part of carriers which are re-configured; whether a sum of a data amount borne on at least one current carrier may carry a service data amount, if yes, a part of processes may be selected for the carrier re-selection.

It should be noted that whether all processes or a part of processes are selected for the carrier re-selection may include not only the above several manners, but also other manners, which is not exhaustive here.

On the basis of the above, there may be following scenarios corresponding to two levels of carrier re-selection timers.

Scenario One

The carrier re-selection timer is a carrier re-selection timer for the terminal device.

Correspondingly, the processing unit 32 determines a numerical value of the carrier re-selection timer based on a movement speed of the terminal device.

The scenario is aimed at a case in which a terminal device (or a user level) corresponds to a carrier re-selection timer, then the terminal device may refer to the same carrier re-selection timer to determine whether it expires regardless of which service the terminal device runs, and then controls all or part of the processes to perform the carrier re-selection.

Scenario Two

The carrier re-selection timer is a carrier re-selection timer corresponding to a service running on the terminal device; and carrier re-selection timers corresponding to different services are different.

Correspondingly, the processing unit 32 determines numerical values of carrier re-selection timers corresponding to different services based on different service types.

Specifically, a numerical value of a carrier re-selection timer corresponding to a service type may be pre-configured according to an actual situation. For example, it may be configured according to a characteristic parameter of the service, and of course, may be configured according to an average data transmission amount of the service, etc., which is not exhaustive here.

Furthermore, the carrier re-selection timer corresponding to the service type may be configured based on the service type in combination with a movement speed of the terminal device.

For example, in a case of service type A, if the movement speed of the terminal device reaches a first level, then a numerical value of the carrier re-selection timer is configured to a; and if the movement speed of the terminal device reaches a second level, the numerical value of the carrier re-selection timer is configured to b.

The processing unit 32 detects whether a carrier re-selection timer corresponding to a service among at least one carrier re-selection timer corresponding to at least one service expires. When a carrier re-selection timer corresponding to a service expires, the carrier re-selection is performed on at least part of processes on at least part of carriers corresponding to the service.

That is, in the scenario, the carrier re-selection is performed on all or part of multiple processes corresponding to the service.

Whether the carrier re-selection is specifically performed on all or part of the processes of the service may be adjusted according to a situation of the carrier, which is not repeated here.

Finally, it should be noted that, if it is detected that the carrier re-selection timer does not expire, a process on which resource re-selection is needed to be performed is determined from the at least one process as a first process; and a carrier of the first process is kept unchanged and the resource re-selection is performed for the first process on the carrier.

In other words, when the timer operates, the carrier re-selection cannot be performed, i.e., for each process, the resource re-selection can only be performed on the current carrier.

In addition, when the carrier re-selection is completed, the timer is restarted.

The sensing and reservation mode in the prior art may be as shown in FIG. 2. When a new data packet arrives at a time point n, and a resource selection is required, the terminal will select a resource within [n+T1, n+T2] milliseconds according to a sensing result during the past 1 second, where T1=4; 20<=T2<=100.

A process for the terminal to select the resource in the selection window is as follows: the terminal selects all available resources in the selection window as a set A, and the terminal performs an exclusion operation on the resources in the set A: if the terminal does not have a sensing result for some subframes in a sensing window, resources of these subframes on the corresponding subframes in the selection window are excluded. If the terminal detects a PSCCH in the sensing window, a PSSCH-RSRP corresponding to the PSCCH is higher than a threshold, and a reserved next transmission resource in the control information has a resource conflict with data to be sent by the user, the user excludes the resource from the set A.

The terminal performs an S-RSSI detection on the remaining resources in the set A, and sorts the remaining resources according to energy from high to low, puts 20% of the resources (relative to the number of resources in the set A) with the lowest energy into a set B. The terminal selects a resource in an equal probability from the set B for data transmission.

However, the above solution of the prior art does not consider a multi-carrier scenario expanded in Rel-15. By adopting the above scheme of the present disclosure, it can be determined whether to control at least part of the processes of the terminal device to perform the carrier re-selection based on the carrier re-selection timer. Thus, the carrier re-selection processing can be independently performed on any one or more of all processes running on the terminal device, thereby providing more processing scenarios for the terminal device to perform the carrier selection.

Figure 4:
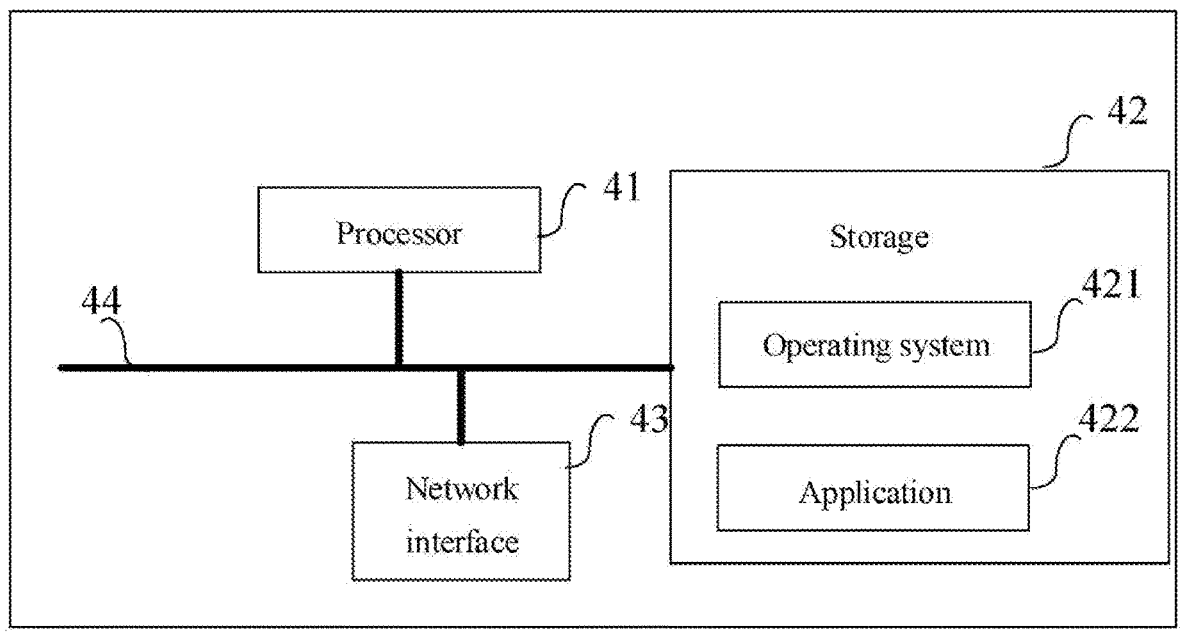
FIG. 4 is a schematic diagram of hardware architecture of a terminal device according to an implementation of the present disclosure.

An implementation of the present disclosure further provides architecture of hardware components of a terminal device. As shown in FIG. 4, the terminal device includes at least one processor 41, a storage 42, and at least one network interface 43. The various components are coupled together by a bus system 44. It may be understood that the bus system 44 is used for implementing connection and communication between these components. In addition to a data bus, the bus system 44 includes a power bus, a control bus, and a status signal bus. However, for clarity, all kinds of buses are uniformly referred to as a bus system 44 in the FIG. 4.

It should be understood that the storage 42 in the implementation of the present disclosure may be a volatile memory or a non-volatile memory, or it may include both volatile and non-volatile memory.

In some implementations, the storage 42 stores following elements, executable modules or data structures, or subsets thereof, or extended sets thereof: an operating system 421 and application 422.

The processor 41 is configured to run at least one process on at least one carrier; wherein different processes are run on a same carrier or different carriers; and if a carrier re-selection timer expires is detected, the processor performs the carrier re-selection on at least part of the at least one process.

An implementation of the present disclosure provides a computer storage medium storing computer executable instructions, and when the computer executable instructions are executed, the acts in the method of the example one are implemented. The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure also provides a computer storage medium in which a computer program is stored, and the computer program is configured to execute the carrier selection method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for carrier selection, applied to a terminal device, comprising:
    running at least one process on at least one carrier, wherein different processes are run on a same carrier or different carriers; and
    when a carrier re-selection timer expires is detected, performing carrier re-selection on at least part of the at least one process,
    wherein the carrier re-selection timer is a carrier re-selection timer corresponding to a service running on a terminal device, and carrier re-selection timers corresponding to different services are different; and
    the method further comprises:
        determining a numerical value of the carrier re-selection timer based on a service type of the service in combination with a movement speed of the terminal device,
        wherein based on a determination that the service type is a first type and the movement speed of the terminal device is a first level, the numerical value of the carrier re-selection timer is configured to a first value; and
        based on a determination that the service type is the first type and the movement speed of the terminal device is a second level, the numerical value of the carrier re-selection timer is configured to a second value.

2. The method according to claim 1, wherein when the carrier re-selection timer expires is detected, performing the carrier re-selection on at least part of the at least one process comprises:
    detecting whether a carrier re-selection timer corresponding to a service among at least one carrier re-selection timer corresponding to at least one service expires; and
    when a carrier re-selection timer corresponding to a service expires, performing the carrier re-selection on at least part of processes on at least part of carriers corresponding to the service.

3. The method according to claim 1, wherein the method further comprises:
    when the carrier re-selection timer does not expire is detected, determining a process on which resource re-selection is needed to be performed from the at least one process as a first process; and keeping a carrier of the first process unchanged, and performing resource re-selection on the first process on the carrier.

4. The method according to claim 1, wherein the method further comprises:

pre-configuring, by the terminal device, the carrier re-selection timer.

5. The method according to claim 1, wherein the method further comprises:

receiving configuration for the carrier re-selection timer from a network side.

6. The method of claim 1, wherein determining the numerical value of the carrier re-selection timers based on the service type of the service in combination with the movement speed of the terminal device comprises:

configuring the numerical value of each of the carrier re-selection timers corresponding to a service type according to a characteristic parameter of a service or an average data transmission amount of the service.

7. The method of claim 5, wherein receiving the configuration for the carrier re-selection timer from a network side comprises:

receiving a configuration parameter for the carrier re-selection timer from the network side, and configuring the carrier re-selection timer based on the configuration parameter.

8. The method of claim 1, further comprising:

selecting, by the terminal, a resource in a selection window, wherein the terminal selects all available resources in the selection window as a set A, and the terminal performs an exclusion operation on the resources in the set A;

based on a determination that the terminal does not have a sensing result for some subframes in a sensing window, resources of these subframes on the corresponding subframes in the selection window are excluded; and based on a determination that the terminal detects a physical sidelink control channel (PSCCH) in the sensing window, a PSSCH-reference signal receiving power (RSRP) corresponding to the PSCCH is higher than a threshold, and a reserved next transmission resource in control information has a resource conflict with data to be sent, the resource is excluded from the set A.

9. A terminal device, comprising: a processor, and a storage for storing a computer program executable on the processor, wherein when executing the computer program, the processor is used for performing acts of:

running at least one process on at least one carrier, wherein different processes are run on a same carrier or different carriers; and when a carrier re-selection timer expires is detected, performing carrier re-selection on at least part of the at least one process, wherein the carrier re-selection timer is a carrier re-selection timer corresponding to a service running on the terminal device, and carrier re-selection timers corresponding to different services are different; and when executing the computer program, the processor is further used for performing an act of:

determining a numerical value of the carrier re-selection timer based on a service type of the service in combination with a movement speed of the terminal device, wherein based on a determination that the service type is a first type and the movement speed of the terminal device is a first level, the numerical value of the carrier re-selection timer is configured to a first value; and based on a determination that the service type is the first type and the movement speed of the terminal device is a second level, the numerical value of the carrier re-selection timer is configured to a second value.

10. The terminal device according to claim 9, wherein when executing the computer program, the processor is further used for performing acts of: detecting whether a carrier re-selection timer corresponding to a service among at least one carrier re-selection timer corresponding to at least one service expires; and when a carrier reselection timer corresponding to a service expires, performing the carrier re-selection on at least part of processes on at least part of carriers corresponding to the service.

11. The terminal device according to claim 9, wherein when executing the computer program, the processor is further used for performing acts of: determining a process on which resource re-selection is needed to be performed from the at least one process as a first process when detecting that the carrier re-selection timer does not expire; and keeping a carrier of the first process unchanged, and performing the resource re-selection on the first process on the carrier.

12. The terminal device according to claim 9, wherein when executing the computer program, the processor is further used for performing an act of: pre-configuring the carrier re-selection timer.

13. The terminal device according to claim 9, wherein when executing the computer program, the processor is further used for performing an act of: receiving configuration for the carrier re-selection timer from a network side.

14. The terminal device of claim 9, wherein determining the numerical value of the carrier re-selection timer based on the service type of the service in combination with the movement speed of the terminal device comprises:

configuring the numerical value of each of the carrier re-selection timers corresponding to a service type according to a characteristic parameter of a service or an average data transmission amount of the service.

15. The terminal device of claim 13, wherein receiving configuration for the carrier re-selection timer from a network side comprises:

receiving a configuration parameter for the carrier re-selection timer from the network side, and configuring the carrier re-selection timer based on the configuration parameter.

16. The terminal device of claim 9, wherein when executing the computer program, the processor is further used for performing an act of:

selecting, by the terminal, a resource in a selection window, wherein the terminal selects all available resources in the selection window as a set A, and the terminal performs an exclusion operation on the resources in the set A;

based on a determination that the terminal does not have a sensing result for some subframes in a sensing window, resources of these subframes on the corresponding subframes in the selection window are excluded; and based on a determination that the terminal detects a physical sidelink control channel (PSCCH) in the sensing window, a PSSCH-reference signal receiving power (RSRP) corresponding to the PSCCH is higher than a threshold, and a reserved next transmission resource in control information has a resource conflict with data to be sent, the resource is excluded from the set A.

17. A non-transitory computer storage medium storing computer-executable instructions, which, when executed, implement acts of:

running at least one process on at least one carrier, wherein different processes are run on a same carrier or different carriers; and when a carrier re-selection timer expires is detected, performing carrier re-selection on at least part of the at least one process, wherein the carrier re-selection timer is a carrier re-selection timer corresponding to a service running on a terminal device, and carrier re-selection timers corresponding to different services are different; and the computer-executable instructions, when executed, further implement acts of:

determining a numerical value of the carrier re-selection timer based on a service type of the service in combination with a movement speed of the terminal device, wherein based on a determination that the service type is a first type and the movement speed of the terminal device is a first level, the numerical value of the carrier re-selection timer is configured to a first value; and based on a determination that the service type is the first type and the movement speed of the terminal device is a second level, the numerical value of the carrier re-selection timer is configured to a second value.

18. The non-transitory computer storage medium of claim 17, wherein the computer-executable instructions, when executed, further implement acts of:

selecting, by the terminal, a resource in a selection window, wherein the terminal selects all available resources in the selection window as a set A, and the terminal performs an exclusion operation on the resources in the set A;

based on a determination that the terminal does not have a sensing result for some subframes in a sensing window, resources of these subframes on the corresponding subframes in the selection window are excluded; and based on a determination that the terminal detects a physical sidelink control channel (PSCCH) in the sensing window, a PSSCH-reference signal receiving power (RSRP) corresponding to the PSCCH is higher than a threshold, and a reserved next transmission resource in control information has a resource conflict with data to be sent, then the resource is excluded from the set A.

19. The non-transitory computer storage medium of claim 17, wherein when the carrier re-selection timer expires is detected, performing the carrier re-selection on at least part of the at least one process comprises:

detecting whether a carrier re-selection timer corresponding to a service among at least one carrier re-selection timer corresponding to at least one service expires; and when a carrier re-selection timer corresponding to a service expires, performing the carrier re-selection on at least part of processes on at least part of carriers corresponding to the service.

20. The non-transitory computer storage medium of claim 17, wherein the computer-executable instructions, when executed, further implement acts of:

when the carrier re-selection timer does not expire is detected, determining a process on which resource re-selection is needed to be performed from the at least one process as a first process; and keeping a carrier of the first process unchanged, and performing resource re-selection on the first process on the carrier.

* * * * *